United States Patent Office.

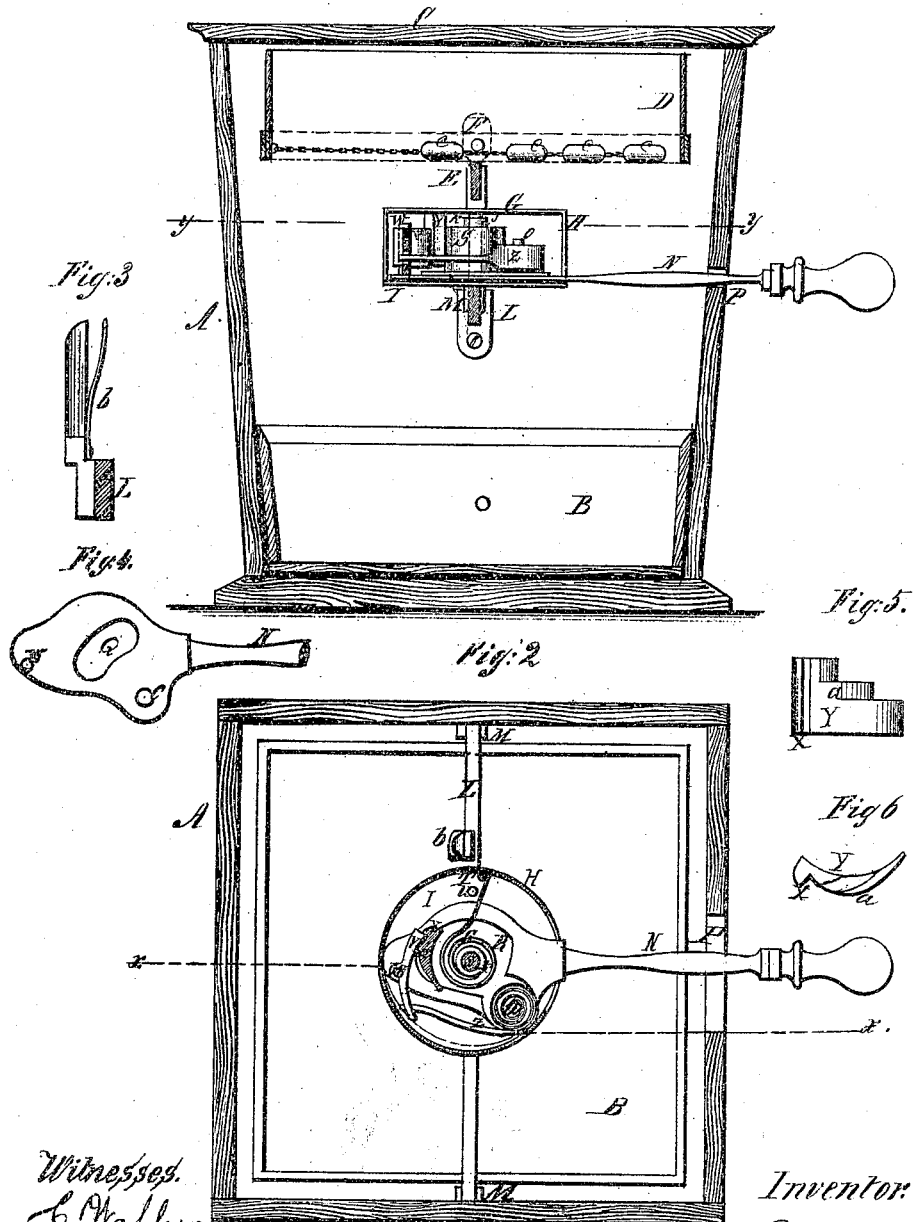

PETER BECKER, OF MOUNT VERNON, NEW YORK.

Letters Patent No. 103,964, dated June 7, 1870.

IMPROVED FLOUR-SIFTER.

The Schedule referred to in these Letters Patent and making part of the same.

*To all whom it may concern:*

Be it known that I, PETER BECKER, of Mount Vernon, in the county of Westchester and State of New York, have invented certain new and useful Improvements in Machines for Sifting Flour and other Articles; and I hereby declare the following to be a full and clear description thereof, reference being had to the accompanying drawing, in which—

Figure 1 represents a vertical section of the apparatus taken in the bent line $x\ x$ of fig. 2;

Figure 2 represents a horizontal section, taken in the plane of the line $y\ y$ of fig. 1;

Figure 3 is a side elevation of the spring buffer, detached;

Figure 4 is a plan of the inner end of the operating lever, detached;

Figure 5 is an elevation of the ratchet-block Y, detached; and

Figure 6 is an inverted plan view thereof.

This invention relates to machinery for sifting flour, sugar, and other articles; and consists in combining a sieve with a pawl and ratchet in such a manner that a reciprocating rotary movement is imparted to it by means of an operating lever connected to the pawl, the ratchet being attached to the sieve and the pawl and ratchet being disconnected from each other at a certain part of the movement of the lever, when the sieve and lever are each brought back to their normal positions by springs, the sieve being thereby caused to strike against a spring buffer, which arrests it with suddenness, but in a yielding manner.

The sieve is provided with a "string" or series of crushers, composed of cylindrical bodies, of wood or other light material, connected to each other by flexible chains or cords, in such a manner that they are free to move and roll over the surface of the sieve, to one side of which one end of the "string" or series of crushers is connected by a chain or cord, so that when the sieve is vibrated, the crushers can take independent positions with respect to each other, and move over the surface of the sieve to and fro, and thereby break up the lumps of flour or other articles contained in the sieve.

The letter A designates a box which contains the sieve and the devices for operating it.

At the bottom of the box is a drawer, B, for receiving the flour or other material which is delivered hrough the meshes of the sieve, and at the top of the box is a hinged cover, C, by opening which access can be had to the sieve D, which sets upon a bar, E, arranged edgewise to the sieve, the ends of the bar being turned up and fastened to the outside of the sieve-frame, as shown at F, fig. 1.

The cross-bar E is rigidly attached at its center to the cover G of the box H, within which the pawl and springs for moving the sieve are placed.

The cover G is connected loosely to the bottom I of the box by a center pin, J, which extends downward from the center of the cover and enters the socket K, which rises from the center of the bottom plate I, so that the cover G and the sieve to which it is attached can turn thereon upon the center-pin J, when the sieve is operated.

The bottom plate I is stationary, and is supported in the outer box A upon a stationary bar, L, whose ends are let down into sockets, M M, arranged on the inside of the outer box A.

N is a lever whose fulcrum is at O, upon and near the edge of the bottom plate I, and whose handle extends outside of box A, through a horizontal slot, P.

The shorter arm of lever N is flattened and laid upon the bottom plate I, over which it moves, and has a curved slot, Q, which surrounds the socket K and allows the lever to be moved to and fro without obstruction from the socket.

The lever N is held down on the bottom plate I by a stationary plate, R, which fits over the fulcrum O of the lever and over the socket-piece K, and above said plate R, and around said socket-piece I arrange a coiled spring, S, whose free end is bent outward toward the side of cover G, in a direction about at a right angle with the handle of lever N, in such a manner as to terminate on the right-hand side of the lug T formed on the side of the cover and on the right-hand side of a stop-pin, U, which rises from the bottom plate I.

The lever N extends nearly across the bottom plate I, and carries a spring pawl or dog V, arranged edgewise thereon, so as to vibrate on a vertical pin, W, which rises from the lever near the extremity of its shorter arm.

The head of the pawl is so arranged as to engage a tooth, X, formed on the outer side of a ratchet-block, Y, fixed to the under side of the cover G, whenever the lever M is moved in the direction of the arrow, fig. 2, and its tail is slotted to receive the end of a coiled spring, Z, which is wound around the fulcrum-pin O, and which causes the lever to swing back to its normal position after every forward movement, and thereby bring the pawl behind the tooth X, and press it against the convex face of the ratchet-block.

The inner side of the ratchet-block Y is concave, and the block is so arranged on the cover G that it does not interfere with the coiled spring S, and its rear end is cut down, as shown in fig. 5, so that it does not come in contact with the spring Z during the movements of the sieve.

The outer face of the ratchet-block, behind the tooth X, is made eccentric at $a$, as is shown in figs. 2 and 6, in order to facilitate the disengagement of the pawl from the tooth, and the construction and operation of the apparatus are such that the pawl moves in a curve eccentric to the curve in which the ratchet-block Y moves, and, consequently, when the pawl approaches the limit of its movement toward the right, the pawl and tooth diverge, and the eccentricity of the face of the ratchet-block at $a$ facilitates the disengagement of the pawl from the tooth.

When the handle of lever N is moved in the direction of the arrow, fig. 2, its shorter arm is swung around over the plate I, and the pawl is caused to move the ratchet-block, and with it the cover G and sieve D, toward the right, and at the same time the spring S is wound about the socket K. This movement continues until the disengagement of the pawl takes place, when the spring S in its recoil presses with its end against the lug T of the cover, and moves the sieve backward toward the left, bringing the side of bar E violently against the spring buffer $b$, which rises from the cross-bar L in such a position as to arrest the sieve suddenly, and thereby cause the flour or other article to be loosened up and delivered through the meshes of the sieve.

The uncoiling of the spring S to an improper extent is prevented by the stop U.

In operating the machine, the lever N is released as soon as the disengagement of the pawl and the automatic return movement of the sieve take place, and the spring Z, which is wound on the pin O by the movement of the lever, immediately restores the lever to its normal position ready to repeat the operation.

The letters $c\ c$, &c., designate the crushing-rollers or blocks, which are connected to each other by flexible chains or cords, so as to form a flexible string or series, one end of which is fastened by a like flexible connection with the side of the sieve within which the crushers are placed, lying loosely on its meshes, so that, during the agitation of the sieve, they are free to move about and break the lumps of flour and reduce them to a fine state.

What I claim as new, and desire to secure by Letters Patent, is—

1. The ratchet-block Y, arranged to move concentrically with the sieve, in combination with the pawl V, arranged to move eccentrically therewith, so as to cause the disengagement of the pawl, substantially as and for the purpose described.

2. The combination of the vibrating sieve with a buffer, arranged and operating substantially as described.

3. The spring-lever N, pivoted to the bottom plate I, as set forth, in combination with the sieve D, substantially as described.

4. The crushers $c\ c$, &c., arranged in a string, as set forth, and connected by one end with the inside of an oscillating sieve, and the other end left free, substantially as described.

5. The combination with the sieve D of the outer box A, the inner box H inclosing the operating pawl and springs, and the lever N, substantially as described.

PETER BECKER

Witnesses:
GERRATT KAPP,
GEORGE WEBER.